United States Patent [19]
May

[11] 4,201,688
[45] May 6, 1980

[54] SCALE INHIBITORS

[75] Inventor: Bronislav H. May, Overijse, Belgium

[73] Assignee: Monsanto Europe S.A., Brussels, Belgium

[21] Appl. No.: 861,395

[22] Filed: Dec. 16, 1977

[30] Foreign Application Priority Data

Jan. 10, 1977 [GB] United Kingdom .................. 739/77

[51] Int. Cl.² .............................................. C02B 5/06
[52] U.S. Cl. ...................................... 252/180; 210/58; 210/59; 252/82; 252/84; 252/86; 252/175; 252/156
[58] Field of Search .................. 252/180, 175, 82, 84, 252/86, 156; 210/58, 59

[56] References Cited

U.S. PATENT DOCUMENTS

| | | | |
|---|---|---|---|
| 3,434,969 | 3/1969 | Ralston | 252/180 X |
| 3,564,047 | 2/1971 | Irani | 252/180 UX |
| 3,669,893 | 6/1972 | Clarke et al. | 252/156 |
| 3,671,448 | 6/1972 | Kowalski | 252/180 |
| 3,705,856 | 12/1972 | Sedliar et al. | 252/156 |
| 3,723,333 | 3/1973 | Freyhold | 252/180 X |
| 3,832,393 | 8/1974 | Krueger et al. | 210/58 X |
| 3,959,168 | 5/1976 | Germscheid et al. | 252/180 |
| 3,965,048 | 6/1976 | Murtaugh | 252/156 |

*Primary Examiner*—Mayer Weinblatt
*Attorney, Agent, or Firm*—George R. Beck

[57] ABSTRACT

Compositions comprising (a) diethylenetriaminopenta(methylenephosphonic acid) or an alkali metal salt thereof and (b) aminotri(methylenephosphonic acid) or an alkali metal salt thereof wherein the amount of (b) is from 5 to 70% of the total weight of (a) and (b) are effective stabilizers against precipitation and scaling of alkaline solutions containing potentially scale-forming components.

6 Claims, No Drawings

SCALE INHIBITORS

BACKGROUND OF THE INVENTION

Dilute caustic alkali solutions, for example sodium hydroxide and potassium hydroxide solutions, are used in a wide range of industrial processes, for example for cleaning bottles and glass pipelines in the diary, soft drinks and brewery industries, in paper pulping processes, and in the scouring and bleaching of textiles.

Such dilute caustic alkali solutions, which may contain from, for example, 0.5 to 5% by weight of the alkali metal hydroxide, are usually prepared by dilution of the concentrated solutions containing perhaps 50% by weight of alkali metal hydroxide supplied by the manufacturer, or possibly by dissolution of the alkali metal hydroxide in solid form.

Exceptionally a process may require the use of a deionized or softened water for the dilution or dissolution, but for most processes, the use of such water is not feasible economically, and ordinary municipal tap water is used. It has been proposed, in order to stabilize such solutions, to add aminotri(methylenephosphonic acid). Diethylenetriaminepenta(methylenephosphonic acid) is another known aminophosphonic acid derivative which functions as a precipitation inhibitor under certain conditions, but which is almost totally ineffective in alkaline solutions at sub-stoichiometric dosages.

SUMMARY OF THE INVENTION

I have now found that the addition of certain, preferably minor, amounts of aminotri(methylenephosphonic acid) to diethylenetriaminepenta(methylenephosphonic acid) transforms what is an ineffective inhibitor into a very potent inhibitor under alkaline conditions, and that the combinations are in fact considerably more active on an equal weight basis than aminotri(methylenephosphonic acid) alone.

The invention accordingly provides a composition comprising (a) diethylenetriaminopenta(methylenephosphonic acid) or an alkali metal salt thereof and (b) aminotri(methylenephosphonic acid) or an alkali metal salt thereof wherein the amount of (b) is from 5 to 70 percent of the total weight of (a) and (b).

A further aspect of the invention is an aqueous solution containing an alkali metal hydroxide and a composition of the invention as defined above.

DESCRIPTION OF PREFERRED EMBODIMENTS

It is envisaged that aqueous solutions within the scope of the invention and most often encountered in practice will fall within one of two concentration ranges, namely the relatively dilute solutions containing perhaps up to 10% by weight of alkali metal hydroxide used in processes such as those referred to above, and more concentrated solutions containing at least 25%, for example from 25 to 50%, by weight of alkali metal hydroxide. It is found that the inhibitor compositions of the invention are generally most effective if the inhibitor composition or its components are first dissolved in an alkali metal hydroxide solution containing at least 25% by weight of alkali metal hydroxide, and this is then mixed with water to give the required dilute solution. Dissolution of the inhibitor in aqueous sodium hydroxide solutions containing 50% or more by weight of sodium hydroxide is difficult and it is preferred to use a solution containing from 25 to 45% by weight of sodium hydroxide.

Depending on the relative proportions of alkali metal hydroxide and inhibitor in the concentrated solution, it may be sufficient to mix a given quantity of the concentrated solution with water to give a dilute solution having the required concentrations of alkali metal hydroxide and inhibitor. If on the other hand, the solution obtained on dilution contains less than the required amount of alkali metal hydroxide, it is of course possible to add alkali metal hydroxide. The characteristic feature of the preferred procedure for preparing all such solutions is that the inhibitor is introduced as a solution in alkali metal hydroxide containing at least 25% by weight of alkali metal hydroxide.

The amount of alkali metal hydroxide in a solution to be used in processes such as those referred to above, will depend on the particular process and the operating conditions. In most bottle washing processes, for example, the wash solution employed contains from 1 to 2% by weight of alkali metal hydroxide.

The amount of inhibitor required for effective stabilization of the solution will also depend on operating conditions, including the degree of hardness of the water. The optimum effective dosage can be readily ascertained by one skilled in the art, and will usually be found to be within the range from 1 to 500 mg/liter (i.e. from 1 to 500 parts per million) more especially from 50 to 500 mg/liter (from 50 to 500 ppm) of solution.

The proportions of the two phosphonic acids or alkali metal phosphonates in the composition of the invention can vary within the limits given above, the optimum in any particular instance being affected by, for example, the hardness of the water and the concentration of the alkali. Normally however, the preferred compositions are those where the amount of component (b) is from 10 to 40%, more especially from 15 to 30% of the combined weight of components (a) and (b).

The inhibitor compositions used in the alkaline solutions of the present invention are effective corrosion inhibitors for mild steel and aluminium. The ability to inhibit the corrosion and dissolution of aluminium is particularly important in present-day bottle washing operations, when bottles to be cleaned frequently have pieces of aluminium adhering to the necks of the bottles, having been left behind on removal of rhe foil used for capping, or have aluminium-plated labels. The aluminium would react rapidly with an uninhibited alkaline solution and would give rise to severe aluminate scaling. By their corrosion-inhibitor action, the present inhibitor combinations reduce the amount of aluminium taken into solution during contact with the alkaline washing solution, thereby reducing the scaling of aluminates in the alkaline bath and during rinsing.

Because of the relatively large amounts of calcium which can be held in the alkaline solutions by the present inhibitor compositions, such solutions may have inadequate detergency in certain applications. Where improved detergency is required, surfactants can be added to the solution. Preferred surfactants are non-ionic surfactants, for example those based on polyalkylene oxides, especially those which give low foam levels.

The invention includes a process for cleaning surfaces, for example glass, metal or glazed ceramic surfaces, in which the surfaces are contacted with a dilute solution of alkali metal hydroxide containing a scale inhibitor and optionally a surfactant, characterized in that the inhibitor is a composition of the invention as defined above.

The abilities of the compositions of the invention and those of the components of the compositions to hold calcium in aqueous alkaline solutions were evaluated by the following method:

(1) Prepare stock solutions in distilled water.
  (a) 11.75 g/liter A.R. $CaCl_2 \cdot 2H_2O$
  (b) 8.40 g/liter A.R. $NaHCO_3$
  (c) 300 g/liter A.R. NaOH
  (d) solutions containing 9 and 20 g/liter of inhibitor and 300 g/liter A.R. NaOH
  (e) 106 g/liter A.R. $Na_2CO_3$
  (f) 3.60 g/liter A.R. HCl (2) add 160 ml distilled water into 250 ml conical flasks with perforated rubber stoppers (about 2 mm perforations are made to prevent pressure build up on heating).

(3) Add 10 ml of $CaCl_2$ solution (a).

(4) Add 10 ml $NaHCO_3$ solution (b).

(5) Swirl by hand and add slowly required volume of inhibitor solution in caustic (d), and supplement to 10 ml total volume with the caustic solution (c).

(6) Add 10 ml $Na_2CO_3$ solution (e).

This gives a solution containing initially 160 ppm of calcium, 3300 ppm of carbonates and 1.5% (weight/volume) of sodium hydroxide.

(7) Put flask for 18 hour storage on an orbital incubator at 73°±3° C., agitating at about 250 rotations per minute.

(8) filter the hot solution under water pump vacuum through a fine 8 cm Büchner filter (sintered disc). This procedure removes all cloudiness in most cases.

(9) Dissolve precipitate by flushing with 200 ml of dilute HCl solution (f).

(10) Analyse concentration of calcium in the HCl solution and convert by difference to concentration of calcium left in inhibited filtrate. Analyses are done by sampling 5 ml of the HCl solution, diluting to 20 ml and adding 1 ml of a 10% $NH_4OH$ buffer (pH 10). Titration is carried out with EDTA N/100 until end point potential of a Ca selective electrode, with an automated radiometer tritrator.

(11) Rinse Büchner filter with distilled water.

In blank trials omitting the calcium chloride solution (a), less than 3 ppm Ca are measured.

The results are shown in the table below, in which A designates diethylenetriaminopenta(methylenephosphonic acid) and B designates aminotri(methylenephosphonic acid) and the "inhibitor" is A, B, or a mixture of A and B, as shown in the left hand column. The analyses were in most instances duplicated as shown by more than one value in the right hand column.

| Solution No. | Weight ratio A:B | Concentration of inhibitor (ppm) | Calcium in filtrate (ppm) | |
|---|---|---|---|---|
| 1 | 0:100 | 170 | 27, | 37 |
| 2 | 0:100 | 280 | 70, | 66 |
| 3 | 100:0 | 170 | 0, | 0, 21 |
| 4 | 100:0 | 280 | 60, | 80 |

-continued

| Solution No. | Weight ratio A:B | Concentration of inhibitor (ppm) | Calcium in filtrate (ppm) | |
|---|---|---|---|---|
| 5 | 33:67 | 170 | 66, | 78 |
| 6 | 33:67 | 280 | 101, | 114 |
| 7 | 50:50 | 170 | 77 | |
| 8 | 50:50 | 280 | 112, | 133 |
| 9 | 67:33 | 170 | 75. | 81 |
| 10 | 67:33 | 200 | 97, | 90 |
| 11 | 67:33 | 280 | 130, | 136 |
| 12 | 75:25 | 170 | 121, | 113 |
| 13 | 75:25 | 280 | 146, | 148 |
| 14 | 80:20 | 55 | 60, | 66 |
| 15 | 80:20 | 110 | 129, | 120 |
| 16 | 80:20 | 170 | 125, | 124 |
| 17 | 80:20 | 280 | 127, | 126 |
| 18 | 90:10 | 170 | 124, | 132 |
| 19 | 90:10 | 280 | 129, | 130 |

Comparison of Solution No. 3 with Solution No. 18, and of Solution No. 4 with Solution No. 19 shows the surprising effect of the addition of as little as 10% of aminotri(methylenephosphonic acid) to diethylenetriaminopenta(methylenephosphonic acid) in producing a marked increase in the amount of calcium held in solution.

Comparison of Solution No. 1 with Solution No. 5, and of Solution No. 2 with Solution No. 6 shows that compositions containing minor proportions of diethylenetriaminopenta(methylenephosphonic acid) are more effective than aminotri(methylenephosphonic acid) at the same concentration of inhibitor.

To obtain an optimum balance of cost and performance, compositions having a weight ratio of diethylenetriaminopenta(methylenephosphonic acid) to aminotri(methylenephosphonic acid) of 85:15 to 70:39, as used, for example, in Solutions 12–17 in the table, are preferred.

The inhibitor compositions of the invention are also effective corrosion inhibitors under non-alkaline conditions, for example in cooling tower and other process waters, especially when used in conjunction with other components having corrosion-inhibiting properties, for example zinc salts, nitrites and triazoles.

What I claim is:

1. A composition useful in scale inhibition consisting essentially of (a) diethylenetriaminopenta(methylenephosphonic acid) or an alkali metal salt thereof and (b) aminotri(methylenephosphonic acid) or an alkali metal salt thereof wherein the amount of (b) is from 15 to 30 percent of the total weight of (a) and (b).

2. An alkaline aqueous solution containing from 1 to 2% by weight of alkali metal hydroxide and a scale formation inhibiting amount of a composition according to claim 1.

3. A solution according to claim 2 containing from 1 to 500 mg/liter of said composition.

4. A solution according to claim 3 containing from 50 to 500 mg/liter of said composition.

5. A solution according to claim 4 in which the alkali metal hydroxide is sodium hydroxide.

6. A method of preparing a solution according to claim 4, which comprises dissolving the composition or its components in an alkali metal hydroxide solution containing from 25 to 45% by weight of alkali metal hydroxide and mixing the solution thus obtained with water, and with additional alkali metal hydroxide if required, to give a solution having the required concentrations of inhibitor and alkali metal hydroxide.